(12) United States Patent
Spyra et al.

(10) Patent No.: US 11,746,689 B2
(45) Date of Patent: Sep. 5, 2023

(54) POWER PLANT AND METHOD FOR OPERATING A POWER PLANT

(71) Applicant: INNIO Jenbacher GmbH & Co OG, Jenbach (AT)

(72) Inventors: Nikolaus Spyra, Innsbruck (AT); Herbert Schaumberger, Munster (AT); Peter Schaeffert, Jenbach (AT); Mario Rainer, Innsbruck (AT); Markus Wasserer, Fugen (AT); Herbert Kopecek, Schwaz (AT)

(73) Assignee: Innio Jenbacher GmbH & Co OG, Jenbach (AT)

( * ) Notice: Subject to any disclaimer, the term of this patent is extended or adjusted under 35 U.S.C. 154(b) by 0 days.

(21) Appl. No.: 17/636,357

(22) PCT Filed: Aug. 21, 2019

(86) PCT No.: PCT/AT2019/060265
§ 371 (c)(1),
(2) Date: Feb. 17, 2022

(87) PCT Pub. No.: WO2021/030849
PCT Pub. Date: Feb. 25, 2021

(65) Prior Publication Data
US 2022/0298955 A1 Sep. 22, 2022

(51) Int. Cl.
*F01P 3/20* (2006.01)
*F02G 5/00* (2006.01)
(Continued)

(52) U.S. Cl.
CPC ............... *F01P 3/20* (2013.01); *F02G 5/00* (2013.01); *F24D 18/00* (2022.01); *F01P 2060/18* (2013.01); *F24D 2101/70* (2022.01)

(58) Field of Classification Search
CPC ............ F01P 3/20; F02G 5/00; F24H 2240/06
See application file for complete search history.

(56) References Cited

U.S. PATENT DOCUMENTS 5,123,239 A 6/1992 Rodgers
6,536,207 B1 * 3/2003 Kamen ............... F02B 61/02
60/524
(Continued)

FOREIGN PATENT DOCUMENTS

CN 205064095 U 3/2016
EP 3343116 A1 7/2018
(Continued)

OTHER PUBLICATIONS

PCT International Search Report for Application No. PCT/AT2019/060265, dated May 15, 2020, 4 pages.
(Continued)

*Primary Examiner* — Long T Tran
(74) *Attorney, Agent, or Firm* — Fletcher Yoder, P.C.

(57) ABSTRACT

Method for operating a power plant for generating energy, comprising at least one stationary internal combustion engine (1) and a district heating system (20) connected to the at least one internal combustion engine (1) in a heat exchange relationship,
wherein the at least one internal combustion engine (1) is configured to deliver a mechanical power by burning a fuel,
wherein on the one hand the at least one internal combustion engine (1) is cooled and on the other hand heat is supplied to the district heating system (20) through a heat exchange between the district heating system (20) and the at least one internal combustion engine (1) and
wherein at least one additional cooling device (12) is provided, (Continued)

Figure 1:
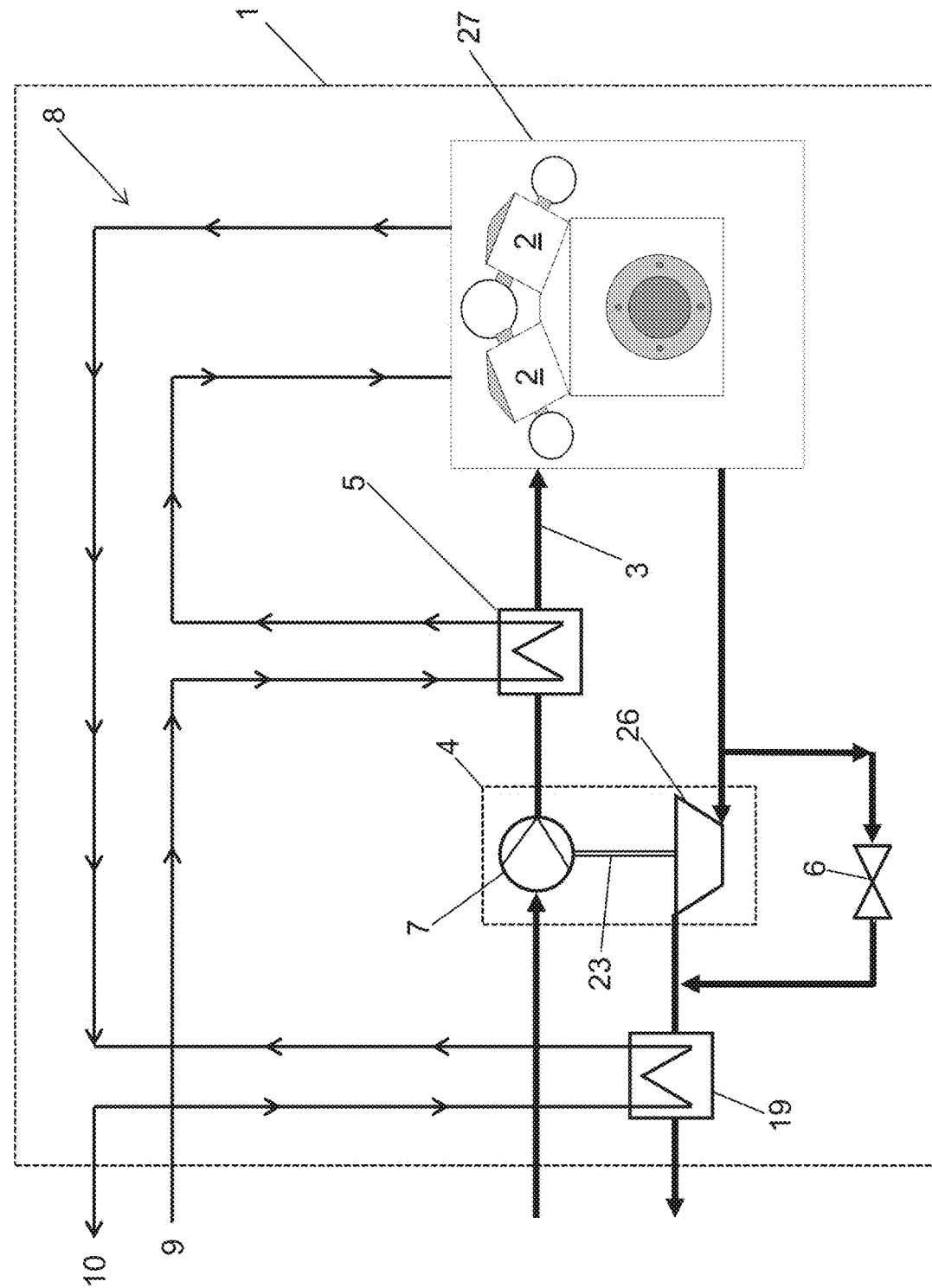

wherein the cooling of the at least one internal combustion engine (1) is effected—at least partially—using the at least one additional cooling device (12) when a transient performance requirement for the at least one internal combustion engine (1) occurs.

20 Claims, 3 Drawing Sheets

(51) Int. Cl.
*F24D 18/00* (2022.01)
*F24D 101/70* (2022.01)

(56) References Cited

U.S. PATENT DOCUMENTS

| | | | |
|---|---|---|---|
| 6,883,504 B1 | 4/2005 | Hynes et al. | |
| 7,107,774 B2 | 9/2006 | Radovich | |
| 7,555,890 B2 | 7/2009 | Kurihara et al. | |
| 7,827,794 B1 | 11/2010 | Pronske et al. | |
| 8,166,747 B2 | 5/2012 | Obana et al. | |
| 9,371,811 B2 | 6/2016 | Argo et al. | |
| 10,036,347 B1* | 7/2018 | Sherry | F02B 63/04 |
| 2002/0108745 A1 | 8/2002 | Kimura | |
| 2005/0116542 A1* | 6/2005 | Kihara | H02J 3/14 |
| | | | 307/29 |
| 2010/0072757 A1* | 3/2010 | Kealy | F02B 37/001 |
| | | | 290/1 A |
| 2011/0094227 A1* | 4/2011 | Ast | F01K 25/08 |
| | | | 60/671 |
| 2012/0282561 A1* | 11/2012 | Kaiser | F24H 1/0027 |
| | | | 432/92 |
| 2013/0104816 A1 | 5/2013 | Nenmeni et al. | |
| 2015/0033778 A1* | 2/2015 | Williams | F25B 29/003 |
| | | | 62/236 |
| 2015/0128625 A1* | 5/2015 | Williams | F24F 5/0035 |
| | | | 62/271 |
| 2016/0230700 A1* | 8/2016 | Yamasaki | F01K 5/02 |
| 2016/0301344 A1 | 10/2016 | Pepe | |
| 2017/0288400 A1* | 10/2017 | Williams | H02J 3/32 |
| 2018/0120000 A1* | 5/2018 | Nikaido | F25B 27/007 |
| 2019/0309997 A1* | 10/2019 | Fletcher | F25B 9/004 |
| 2019/0331020 A1* | 10/2019 | Craig | F02B 29/0418 |

FOREIGN PATENT DOCUMENTS

| | | |
|---|---|---|
| JP | S58106336 A | 6/1983 |
| JP | 20160176425 A | 10/2016 |
| WO | 0218765 A1 | 3/2002 |

OTHER PUBLICATIONS

PCT Written Opinion for Application No. PCT/AT2019/060265, dated May 15, 2020, 5 pages.

S.H Najjar, "Gas turbine cogeneration systems: a review of some novel cycles", Applied Thermal Engineering, vol. 20, Feb. 2000, pp. 179-197.

Sazali et al., "Emission Reduction Potential in PTA Production Plant through Cogeneration Technology", 2011 3rd International Symposium & Exhibition in Sustainable Energy & Environment, Jun. 1-3, 2011, Malaysia, pp. 28-32.

* cited by examiner

POWER PLANT AND METHOD FOR OPERATING A POWER PLANT

The present invention concerns a method for operating a power plant which is designed to generate energy with the features of the preamble of claim 1 and a power plant with the features of the preamble of claim 11.

Power plants known in the state of the art comprise at least one stationary internal combustion engine, which is configured to deliver a mechanical power by burning a fuel. Typically types of fuels for operating a stationary internal combustion engine are burnable gases (like natural gas), diesel, gasoline or heavy fuels.

To increase the overall efficiency of at least one stationary internal combustion engine it is known to connect or integrate the internal combustion engine to a district heating system. This allows to exchange heat between the district heating system and the at least one internal combustion engine, wherein on the one hand the at least one internal combustion engine is cooled and, on the other hand, heat is supplied to the district heating system.

To reach a better overall efficiency of the power plant it is common to operate the internal combustion engine with an increased engine temperature to provide the district heating system with as much thermal energy as possible. This leads automatically to a decreased efficiency of the internal combustion engine in isolation. This not optimal operation of the internal combustion engine is tolerated because the overall efficiency of the power plant increases.

In most cases, the district heating system comprises a plurality of sources of heat (beside the at least one internal combustion engine). Further, district heating systems comprise a very high thermal inertia because of the large amount of thermally affected masses and their thermal storage properties.

Therefore, if the internal combustion engine is inactive or operates in idle, the internal combustion engine may maintain a temperature given by the district heating system. In other words: the internal combustion engine does not cool down in an inactive operation state or during idle. This leads to the advantage that the internal combustion engine does not have to be pre-heated before starting.

A disadvantage of such a configuration is that the whole internal combustion engine is heated by the district heating systems and therefore also the intake manifold of the internal combustion engine and thus the charge air or air-fuel mixture have an undesired higher temperature level right at the start of the internal combustion engine. Higher temperature of the charge air or air-fuel mixture leads to a lower density of the same, which affects the power output of the internal combustion engine. This, however, leads to an increase of starting time and also to an increase of transient time at change of load of the internal combustion engine. Additionally, the generated exhaust pollution—like the $NO_x$-level—increases. To ensure that the $NO_x$ limits (and other pollutants limits), which are given by the national legislature, are not exceeded a very slow start has to be chosen to keep the NOx emissions low.

The present invention's purpose is to provide a method for operating a power plant and a power plant, wherein a faster reaction corresponding to a transient performance requirement is possible with reduced or constant emitted emissions.

This is being achieved by a method for operating a power plant with the features of claim 1 and a power plant with the features of claim 11. Some advantageous embodiments of the invention are defined in the dependent claims.

According to the invention it is provided that cooling of the at least one internal combustion engine is effected—at least partially—using the at least one additional cooling device when a transient performance requirement for the at least one internal combustion engine occurs.

For example, to ensure a reliable operation of the internal combustion engine in most cases additional cooling devices (next to the district heating system and possible other regular cooling systems of the at least one internal combustion engine) are provided. In case that the cooling of the internal combustion engine no longer can be done by the district heating system (for whatever reason), the additional cooling devices can take over the cooling of the internal combustion engine to prevent an overheating of the internal combustion engine ensuring reliable operation. Additional cooling devices—in principle known in the prior art—therefore could be viewed as cooling emergency units for the internal combustion engine.

These already present, but usually inactive additional cooling devices can for example be used by the invention to increase the power output of the internal combustion engine (and/or to decrease emissions) for a short term, essentially during the occurrence of a transient performance requirement.

Alternatively, separate additional cooling devices can be provided, e.g. as thermal reservoir, preferably as at least one roof top cooler and/or thermal storage mass.

The term "district heating system" does not necessarily mean that this heating system has to be used for heating a district of a city or a town. A district heating system can be used to provide heating for any number of structures (e.g. residences, industrial or agricultural buildings).

The district heating system usually uses a tempering medium as heat carrier to facilitate the transfer/transport of heat. This tempering medium could for example be oil, air, water with or without additives and so on. Tempering mediums can be used for heating and/or cooling systems.

It can be provided that the transient performance requirement relates to a start of the at least one internal combustion engine. The start of at least one internal combustion engine means transferring the internal combustion engine from an inactive state until a predeterminable engine speed or a predeterminable power output is reached.

It can also be provided that the transient performance requirement relates to the performance increase of the at least one internal combustion engine e.g. for creating additional electrical power. Also, if an increased performance requirement for the internal combustion engine occurs the emissions generated by the increase can be reduced using the additional cooling devices according to the invention. It is also possible to achieve the performance increase faster with unchanged emitted emissions.

It can be provided that a connection between the at least one additional cooling device and a cooling system for the combustion air and/or the fuel—preferably at least one intercooler and or a thermal reservoir—of the at least one internal combustion engine is established when a transient performance requirement occurs. The cooling of the fuel, the fuel mixture or the combustion air has a direct effect on the combustion process and the combustion temperature. In this way the emissions emitted by the combustion can be controlled.

It can be provided that a connection between the at least one additional cooling device and an engine cooling system is established when a transient performance requirement occurs.

It can be provided that during operation of the at least one internal combustion engine the at least one internal combustion engine is cooled by the district cooling system and the at least one internal combustion engine is separated from the district cooling system when a transient performance requirement occurs. Therefore it can be provided that the whole internal combustion engine is cooled by the at least one additional cooling device during a transient performance requirement.

Preferably, at least one intake manifold of at least one internal combustion engine is cooled by an additional cooling device during a transient performance requirement.

Cooling at least one intake manifold leads to a temperature reduction of the charge air or the charge fuel-air mixture, which leads to an increase of mass of air or fuel-air mixture into at least one cylinder of the internal combustion engine and therefore results in an increase of the power output of the internal combustion engine. According to the invention the intake manifold is cooled by the at least one additional cooling device, preferably in addition to a common cooling device, which cools the intake air or fuel-air mixture.

It can be provided, that the at least one additional cooling device comprises a reservoir, with which heat is exchanged. Such a reservoir can be a fluid reservoir with fluid, e.g. water, being preferably colder than the engine part (e.g. the intake manifold) which has to be cooled during a transient performance requirement.

It can be provided that the at least one additional cooling device is provided for a plurality of internal combustion engines. It is quite conceivable that also other energy systems which have to be cooled and deliver thermal energy can be coupled to the at least one additional cooling device, e.g. combustion turbines.

It can be provided that an electric generator is driven by the at least one internal combustion engine, which generator preferably delivers electrical energy to an energy supply network (grid).

It can be provided that the—at least partial—cooling of the at least one internal combustion engine using the additional cooling device is stopped after a transient performance requirement when a quasi-stationary performance requirement occurs.

It can be provided that that the additional cooling device is provided for a safe operation of the at least one internal combustion engine.

A quasi-stationary performance requirement means a nearly constant or slowly changing performance requirement, wherein performance requirement changes slow enough, so that the operation of the internal combustion engine can be viewed as stationary at each point in time of a given time period.

A power plant according to the invention comprises:
at least one stationary internal combustion engine, wherein the at least one internal combustion engine is configured to deliver a mechanical power by burning a fuel,
a district heating system connected to the at least one internal combustion engine, wherein through a heat exchange between the district heating system and the at least one internal combustion engine on the one hand the at least one internal combustion engine is cooled and on the other hand heat is supplied to the district heating system,
at least one additional cooling device and
at least one open or closed loop control unit, characterized in, that the at least one open or closed loop control unit is configured to open or closed loop control a cooling of the at least one internal combustion engine by activating and/or deactivating of the additional cooling device when a transient performance requirement the at least one internal combustion engine occurs.

Figure 2A:
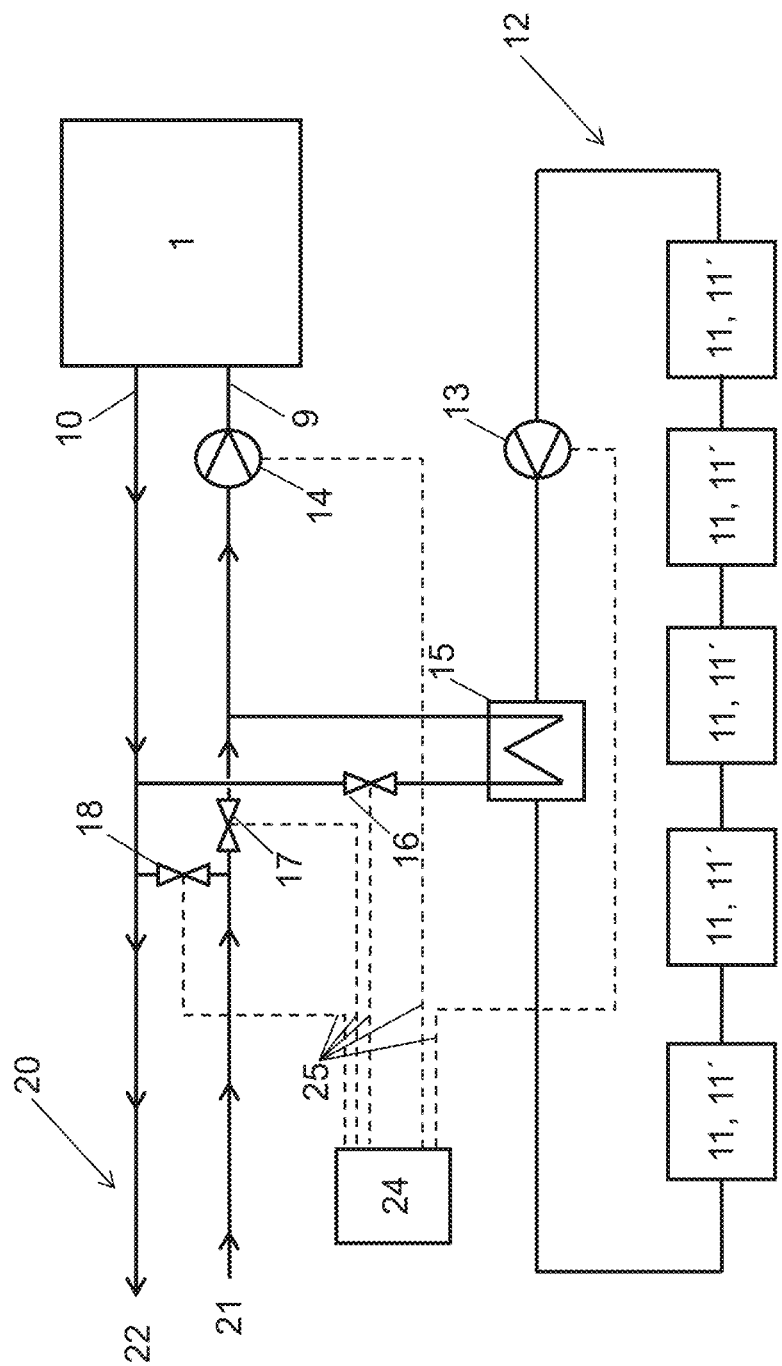
Figure 2B:
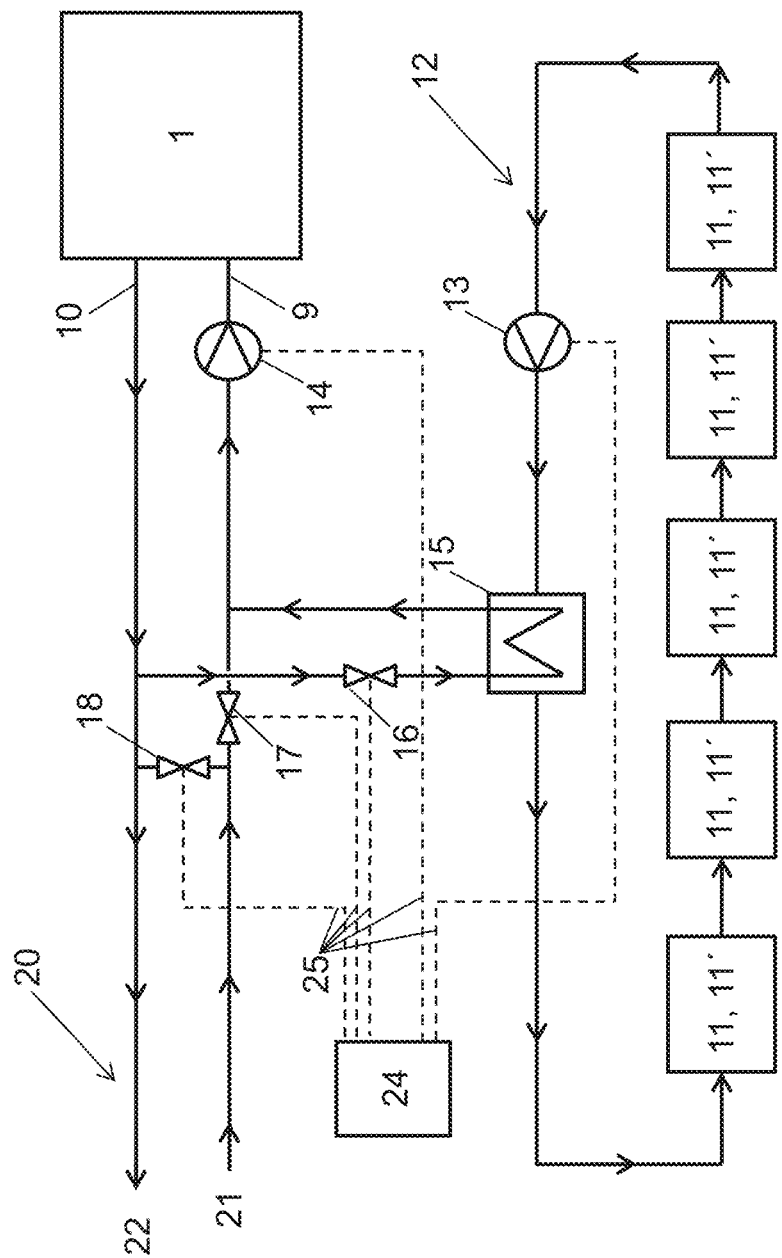

Further details and advantages of the invention are apparent from the accompanying figures and the following description of the drawings. The figures show:

FIG. 1 a stationary internal combustion engine,

FIG. 2a an internal combustion engine in conjunction with district heating system and FIG. 2b an internal combustion engine in conjunction with district heating system when a transient performance requirement occurs.

FIG. 1 shows a stationary international combustion engine 1, wherein the internal combustion engine 1 comprises a turbo charger 4. By means of the turbo charger 4 air or an air-fuel mixture can be charged for the combustion in the internal combustion engine 1. This air or air-fuel mixture is charged by the compressor 7 of the turbo charger 4. The turbo charger 4 further comprises an exhaust gas turbine 26, which is connected to the compressor 7 by a shaft 23. The exhaust gas turbine 26 is driven by exhaust gas coming from the internal combustion engine 1, where the exhaust gas is produced by combustion of the air fuel mixture.

This combustion normally takes place in the combustion chambers 2 of the internal combustion engine 1. For combustion in mixed charged internal combustion engines a charged air-fuel mixture is fed to the combustion chamber 2 of the internal combustion engine 1. For combustion in supercharged internal combustion engines having a fuel port injection a charged air is fed to the internal combustion engine 1, a fuel is separately fed to the internal combustion engine 1 by means of port injection nozzles. When charging air or an air-fuel mixture the air or the air-fuel mixture also is heated by the compression operation. For reducing the temperature of the air or the air-fuel mixture an intercooler 5 is provided. After passing the intercooler 5 the air or the air-fuel is guided to the combustion chambers 2 via the intake manifold 3.

The exhaust gas turbine 26 can be bypassed by means of a bypass conduct and a bypass valve 6. This bypass valve 4 can be connected with a control unit of the internal combustion engine 1, which is configured to open or closed loop control the bypass valve 6. The control unit of the internal combustion engine 1 can be configured to determine a pressure difference, from pressure measurements downstream and upstream of the exhaust gas turbine 26 and control the charge pressure by control an opening degree of the bypass valve 6.

Furthermore, the internal combustion engine 1 comprises an engine cooling system 8 for cooling the internal combustion engine 1 during operation. In this embodiment of an internal combustion engine 1 the cooling system 8 comprises a supply line 9 (coming from the district heating system 20—explained in the following figures in more detail) entering the internal combustion engine 1 and passing through the intercooler 5 cooling the air or the air-fuel. Here the intercooler 5 acts as a heat exchanger. After passing the intercooler the tempering medium of the cooling system 8 is guided to the engine block 27, for cooling the engine block 27. Before entering the return line 10—in the shown embodiment of FIG. 1—a heat exchange takes place between the medium of the cooling system 8 and the exhaust gas in the exhaust heat exchanger 19 for heating the tempering medium as much as possible in order to increase the efficiency of the district heating system 20.

FIG. 2a shows the internal combustion engine 1 (embodiment for example as in FIG. 1) in conjunction with a district heating system 20 during normal operation. A tempering medium is pumped by the circulation pump 14 corning from a supply line 21 of the district heating system 20 to the internal combustion engine 1, wherein through a heat exchange between the district heating system 20 and the at least one internal combustion engine 1 on the one hand the at least one internal combustion engine 1 is cooled and on the other hand heat is supplied to the district heating system 20. After passing through the internal combustion engine 1 the tempering medium is led through the return line 22 of the district heating system 20 to a field of application (not shown by the figures), where the thermal energy from the district heating system 20 is used for heating or is used for another thermal process.

An emergency cooling device (used as additional cooling device 12 in this embodiment) is provided for cooling the internal combustion engine 1 if the cooling of the internal combustion engine 1 can no longer be performed by the district heating system 20 (e.g. because of a failure of the district heating system). This emergency cooling device ensures a safe operation of the internal combustion engine 1.

The additional cooling circuit comprises a plurality of cooling devices (in this embodiment designed as roof top coolers 11). Using another circulation pump 13 the tempering medium in the additional cooling circuit is circulated. The circulation pump 13 can be controlled by an open or closed loop control unit 24. The open or closed loop control unit 24 is connected to the circulation pump 13 via signal lines 25 (shown in the figure as dashed lines).

The open or closed loop control unit 24 is also connected to several valves 16, 17, 18 to control the medium flow of the district heating system 20.

During normal operation—quasi-stationary performance requirement—(as shown by FIG. 2a) the medium flow is controlled by the open or closed loop control unit 24 by closed valves 16, 18 and open valve 17. This allows the tempering medium to flow directly from the supply line 21 of the district heating system 20 to the internal combustions engine 1 and after a heat exchange with the internal combustion engine 1 from the internal combustions engine 1 to the return line 22 of the district heating system 20.

The open or closed loop control unit 24 is configured to close valve 17 and open valve 18 when a transient performance requirement occurs for the at least one internal combustion engine 1 (as shown in FIG. 2b), wherein the district heating system 20 is separated from the cooling system 8 of the internal combustion engine 1. At the same time the open or closed loop control unit 24 is configured to open valve 16 and activate the circulation pump 13 (if this pump does not already work). By opening the valve 16 the engine cooling system 8 is connected to the additional cooling device 12, wherein the internal combustion engine 1 is cooled by the additional cooling device 12 via the heat exchanger 15.

It can be provided that after the occurrence of a transient performance requirement to the internal combustion engine 1 the open or closed loop control unit 24 closes the valves 16, 18 and opens the valve 17 to continue with normal operation (as explained in connection with FIG. 2a).

It can be provided that the at least one additional cooling circuit 12 comprises at least one (thermal) reservoir 11' (also referred to roof top coolers), wherein an exchange of heat between the cooling medium coming from the internal combustion engine, preferably coming from intake manifold of the internal combustion engine, and said reservoir takes place during a transient performance requirement. The (thermal) reservoir can be any fluid like air or liquid.

REFERENCE SIGNS 1 internal combustion engine
2 combustion chamber
3 intake manifold
4 turbo charger
5 intercooler
6 bypass valve
7 compressor
8 engine cooling system
9 supply line of the engine cooling circuit
10 return line of the engine cooling circuit
11 roof top cooler
11' (thermal) reservoir
12 additional cooling device
13 circulation pump
14 circulation pump
15 heat exchanger 15
16 valve
17 valve
18 valve
19 exhaust heat exchanger
20 district heating system
21 supply line of the district heating system
22 return line of the district heating system
23 shaft
24 open or closed loop control unit
25 signal lines
26 exhaust gas turbine
27 engine block

The invention claimed is:

1. A method for operating a power plant for generating energy, comprising:
    exchanging heat between at least one internal combustion engine and a district heating system via a first cooling circuit fluidly coupling the at least one internal combustion engine with the district heating system in a heat exchange relationship, wherein the at least one internal combustion engine is configured to deliver a mechanical power by burning a fuel, wherein exchanging heat via the first cooling circuit comprises cooling the at least one internal combustion engine and heating the district heating system via the heat exchange relationship between the district heating system and the at least one internal combustion engine; and
    exchanging heat between at least one additional cooler and the at least one internal combustion engine via a second cooling circuit, wherein exchanging heat via the second cooling circuit comprises cooling the at least one internal combustion engine in response to a transient performance requirement for the at least one internal combustion engine.

2. The method as set forth in claim 1, wherein the transient performance requirement relates to a start of the at least one internal combustion engine.

3. The method as set forth in claim 1, wherein exchanging heat via the second cooling circuit comprises selectively connecting the at least one additional cooler and a cooling system for the combustion air and/or the fuel of the at least one internal combustion engine in response to the transient performance requirement for the internal combustion engine, wherein the cooling system comprises an intercooler downstream from a compressor of a turbocharger.

4. The method as set forth in claim 1, wherein exchanging heat via the second cooling circuit comprises selectively connecting the at least one additional cooler and an engine cooling system in response to the transient performance requirement.

5. The method as set forth in claim 1, wherein exchanging heat via the second cooling circuit comprises selectively disconnecting the at least one internal combustion engine from the district heating system in response to the transient performance requirement.

6. The method as set forth in claim 1, wherein the at least one additional cooler is provided for a plurality of internal combustion engines.

7. The method as set forth in claim 1, comprising an electric generator driven by the at least one internal combustion engine.

8. The method as set forth in claim 1, wherein the transient performance requirement relates to a performance increase of the at least one internal combustion engine, wherein the performance increase comprises an increase of power output and/or a decrease of emissions of the internal combustion engine.

9. The method as set forth in claim 1, comprising stopping the exchanging of heat between the at least one additional cooler and the at least one internal combustion engine via the second cooling circuit after the transient performance requirement when a quasi-stationary performance requirement occurs.

10. The method as set forth in claim 1, wherein the additional cooler is provided for a safe operation of the at least one internal combustion engine.

11. A power plant for generating energy, comprising:
- at least one internal combustion engine, wherein the at least one internal combustion engine is configured to deliver a mechanical power by burning a fuel;
- a district heating system;
- a first cooling circuit fluidly coupling the at least one internal combustion engine with the district heating system in a heat exchange relationship, wherein the first cooling circuit is configured to cool the at least one internal combustion engine and heat the district heating system via the heat exchange relationship;
- at least one additional cooler coupled to the at least one internal combustion engine via a second cooling circuit; and
- at least one open or closed loop control unit, wherein the at least one open or closed loop control unit is configured to open or closed loop control a cooling of the at least one internal combustion engine by activating and/or deactivating of the at least one additional cooler in response to a transient performance requirement for the at least one internal combustion engine.

12. The power plant for generating energy as set forth in claim 11, wherein the at least one additional cooler is configured as thermal reservoir comprising at least one roof top cooler and/or thermal storage mass.

13. The power plant for use of energy generation as set forth in claim 11, wherein the least one open or closed loop control unit is configured as a central engine control unit of the at least one internal combustion engine.

14. The power plant for use of energy generation as set forth in claim 11, wherein the at least one additional cooler comprises at least one circulation pump.

15. The power plant for use of energy generation as set forth in claim 11, wherein the at least one open or closed loop control unit is configured to:
- in response to the transient performance requirement, selectively close a first valve along the first cooling circuit to block heat exchange between the at least one internal combustion engine and the district heating system and selectively open a second valve between the first and second cooling circuits to enable heat exchange between the at least one internal combustion engine and the at least one additional cooler; and
- in response to a quasi-stationary performance requirement, selectively open the first valve along the first cooling circuit to enable heat exchange between the at least one internal combustion engine and the district heating system and selectively close the second valve between the first and second cooling circuits to block heat exchange between the at least one internal combustion engine and the at least one additional cooler.

16. A system, comprising:
- an engine controller configured to control a first heat exchange via a first cooling circuit and a second heat exchange via a second heat exchange circuit, wherein the first cooling circuit is configured to enable the first heat exchange between an internal combustion engine and a district heating system, the second cooling circuit is configured to enable the second heat exchange between the internal combustion engine and an additional cooler, and the engine controller is configured to selectively activate the second heat exchange via the second cooling circuit in response to a transient performance requirement and subsequently deactivate the second heat exchange via the second cooling circuit after the transient performance requirement.

17. The system as set forth in claim 16, wherein the transient performance requirement comprises a startup of the internal combustion engine.

18. The system as set forth in claim 16, wherein the engine controller is configured to selectively deactivate the first heat exchange via the first cooling circuit in response to the transient performance requirement and subsequently activate the first heat exchange via the first cooling circuit after the transient performance requirement.

19. The system of claim 16, comprising the internal combustion engine, the first and second cooling circuits, and the additional cooler, wherein the first cooling circuit is coupled to a heat exchanger to circulate a first working fluid through the heat exchanger, the second cooling circuit is coupled to the heat exchanger to circulate a second working fluid through the heat exchanger the first and second working fluids are separate from one another in the heat exchanger.

20. The system of claim 19, wherein the first cooling circuit comprises a supply line and a return line extending between the internal combustion engine and the district heating system, a first line extends between the supply line and the return line, a second line extends between the return line and the heat exchanger, a third line extends between supply line and the heat exchanger, a first valve is disposed along the supply line, a second valve is disposed along the second line, and a third valve is disposed along the first line, wherein the engine controller is configured to selectively control the first, second, and third valves to active and deactivate the first and second heat exchanges via the first and second cooling circuits.

* * * * *